(12) United States Patent
Bartolini et al.

(10) Patent No.: US 6,545,798 B2
(45) Date of Patent: Apr. 8, 2003

(54) THERMAL RIPPLE-COMPENSATING, GAIN-FLATTENING FILTER FOR AN OPTICAL AMPLIFIER

(75) Inventors: Glenn D. Bartolini, Waltham, MA (US); Vikram Bhatia, Painted Post, NY (US); Peter G. Wigley, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/829,590

(22) Filed: Apr. 9, 2001

(65) Prior Publication Data

US 2002/0171915 A1 Nov. 21, 2002

(51) Int. Cl.[7] .............................................. H04B 10/12
(52) U.S. Cl. ..................................... 359/337.1; 359/337
(58) Field of Search ................................. 359/339, 337, 359/337.1, 337.2

(56) References Cited

U.S. PATENT DOCUMENTS

| | | | | |
|---|---|---|---|---|
| 5,841,583 | A | | 11/1988 | Bhagavatula ................ 359/577 |
| 5,042,898 | A | * | 8/1991 | Morey et al. .................. 385/37 |
| 5,699,468 | A | * | 12/1997 | Farries et al. ................ 385/140 |
| 5,703,978 | A | * | 12/1997 | DiGiovanni et al. ........ 359/130 |
| 5,706,125 | A | * | 1/1998 | Nakano ........................ 359/124 |
| 5,740,292 | A | * | 4/1998 | Strasser ........................... 372/6 |
| 5,757,540 | A | * | 5/1998 | Judkins et al. ........... 359/337.21 |
| 5,900,970 | A | * | 5/1999 | Kakui ........................... 359/130 |
| 6,049,414 | A | | 4/2000 | Espindola et al. ........... 359/337 |
| 6,141,130 | A | * | 10/2000 | Ip ................................. 359/124 |
| 6,311,004 | B1 | * | 10/2001 | Kenney et al. .............. 385/130 |

OTHER PUBLICATIONS

Dung et al. Elec. Letts. Mar. 19, 1998. vol. 34 No. 6.*
Kokubun et al. IEEE Phot. Tech. Letts. vol. 5 No. 11, Nov. 1993.*
Kokubun et al. ECOC vol. 3 Sep. 15–19, 1996.*
Kokubun et al. Elec. Letts. Feb. 19, 1998 vol. 34 No. 4.*
Kokubun et al. CLEO Aug. 30–Sep. 3, 1999 vol. 4.*
Nakagawa et al. OFCC Mar. 7–10, 2000 vol. 2.*
Nakaji et al Ultra–Wide Dynamic Range Erbium Doped Fiber Amplifies Employing Variable Attenuation Slope Compensator OW A2–1 / 167.
Shimojoh et al. Compensation of L–band Gain–Wavelength Characteristics Using Linear and Second–order Variable Gain Equalizers OW A3–2 / 171.
R. Di Muro, B. Flintham, S.J. Wilson, M. Healy, "$Er^{3+}$ doped fibre amplifier temperature characteristics in extended and conventional band regions with gain control compensation".

* cited by examiner

Primary Examiner—Thomas G. Black
Assistant Examiner—Stephen Cunningham
(74) Attorney, Agent, or Firm—Juliana Agon; Price Heneveld Cooper DeWitt & Litton

(57) ABSTRACT

An optical device including an optical amplifier to amplify optical signals received through an optical input, and to supply the amplified optical signals from an optical output, and an optical filter component to compensate for variations in the gain spectrum of the optical amplifier that occur as a function of wavelength and operating temperature. The optical filter component includes a first optical filter having an athermalized transmission spectrum and a second optical filter having a transmission (or insertion loss) spectrum that varies as a function of operating temperature.

14 Claims, 2 Drawing Sheets

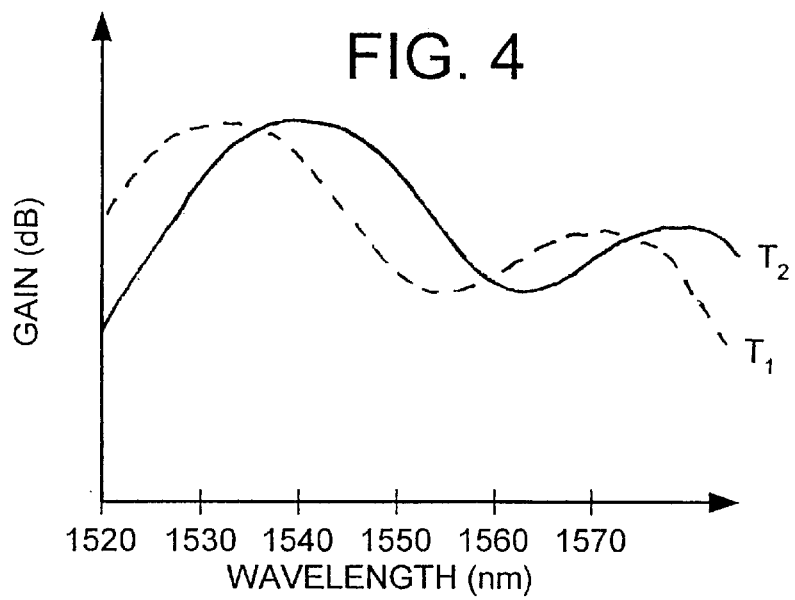
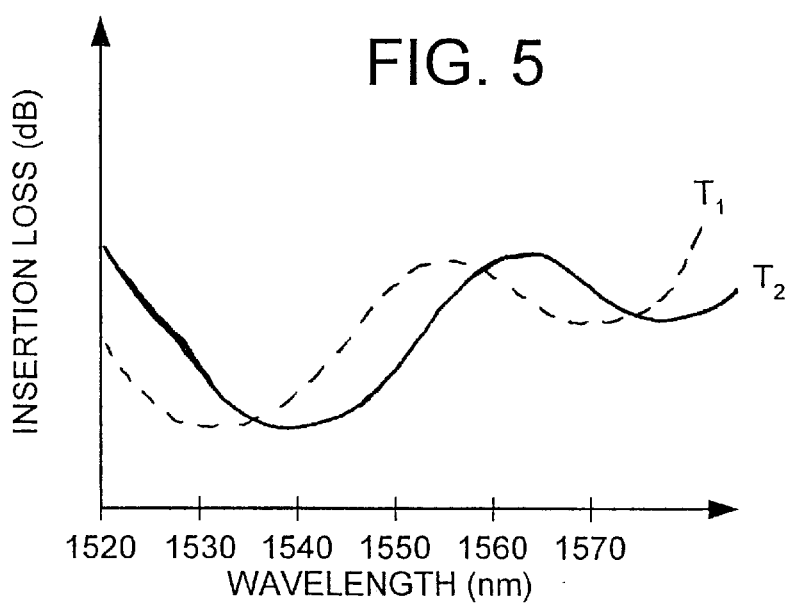

THERMAL RIPPLE-COMPENSATING, GAIN-FLATTENING FILTER FOR AN OPTICAL AMPLIFIER

BACKGROUND OF THE INVENTION

1. Field of the Invention

The present invention generally relates to optical amplifier systems and, more particularly, relates to optical filters for flattening the gain of an optical amplifier over an operating wavelength band.

2. Technical Background

In an optical network, optical signals are typically transmitted through a fiber over relatively long distances. Because the strength of the optical signals tends to decrease with increasing transmission path length, it has become commonplace to divide the fibers into spans, with in-line optical amplifiers positioned between the spans. The typical span is, for example, 80–120 km in length. While the in-line optical amplifiers boost the signal strength of the transmitted optical signals, such optical amplifiers typically do not exhibit flat gain characteristics over the band of wavelengths of the optical signals that are transmitted through the optical amplifier. Thus, in an optical network, if each of the optical amplifiers positioned between each fiber span amplify optical signals having certain wavelengths more than they amplify optical signals having other wavelengths, some optical signals will not be amplified sufficiently over a long transmission path and those signals will be more susceptible to errors.

To provide for uniformity of signal amplification at each span of all optical signals transmitted through the network, various techniques have been proposed to flatten the gain of the optical amplifiers so that all the optical signals are amplified the same amount by each optical amplifier provided along a given transmission path. One technique that has been proposed is to provide a gain-flattening dielectric optical filter that has an insertion loss spectrum (also referred to as the "transmission spectrum") that is inversely related to the gain spectrum of the optical amplifier. In other words, the gain-flattening filter will attenuate those wavelengths that are more greatly amplified by the optical amplifier such that the output of the gain-flattened amplifier exhibits a substantially flat and equal gain for all the wavelengths in the wavelength band of interest.

One problem that arises through the use of optical amplifiers and, in particular, erbium-doped fiber amplifiers, is that the gain spectrum tends to vary with fluctuations in the operating temperature. Such optical amplifiers may be exposed to operating temperatures ranging from −5° C. to 75° C. Unless otherwise compensated, the gain spectrum of the optical amplifier will change significantly with temperature. In general, all components in the amplifier contribute to this variation, but the dominant contributions are typically from the gain medium (i.e., the erbium-doped fiber coil).

Some techniques that have been employed to compensate for these thermal gain variations, which are also known as "thermal wiggle" or "thermal ripple," include providing a heating system for maintaining the erbium-doped fiber coil of the optical amplifier at temperatures close to the upper range of the operating temperatures to which the optical amplifier would otherwise be exposed or to provide, and providing a thermal controller for double-sided control whereby the fiber coil is maintained at a fixed temperature by heating and cooling. Thus, these solutions basically eliminates the cause of the variation in the gain spectrum of the optical amplifier medium.

By providing a heating system in the optical amplifier and thereby stabilizing the gain spectrum with respect to temperature, designers of optical amplifier systems have made concerted efforts to design gain-flattening filters whose insertion loss spectrums do not vary as a function of operating temperature. By stabilizing both the gain spectrum of the optical amplifier and the insertion loss spectrum of the gain-flattening filter with respect to temperature, the overall gain of the optical amplifier system remains substantially flat over the wavelength band of interest (i.e., generally 1530–1560 nm) and maintains the substantially flat characteristic over the operating temperature range.

Although the above-described solution has become commonplace, the use of a heating system introduces several disadvantages. First, the heating system itself adds considerable expense not only in terms of manufacturing and installation costs, but it also adds significantly to the thermal budget for removing heat from the entire module and adds a reliability risk if the thermal control system should fail.

A solution to these problems is disclosed in U.S. Pat. No. 6,049,414 issued to Espindola et al. (the '414 patent) The '414 patent discloses a gain-flattening filter having a transmission spectrum that varies as a function of temperature so as to compensate for variations in the gain spectrum of the optical amplifier that occur as a function of wavelength and temperature. The gain flattening filter disclosed in the '414 patent includes a composite filter having a plurality of concatenated fiber Bragg gratings (FBG) or a long period gratings each having different shift coefficients. By providing such a gain flattening filter, the need for a thermal controller is effectively eliminated.

While the solution disclosed in the '414 patent is sound in theory, the design and construction of such a gain flattening filter is not practical due to the difficulty in simply designing a FBG or long fiber grating filter that compensates for amplifier gain as a function of wavelength, let alone designing a FBG or long fiber grating filter that also compensates for amplifier gain as a function of temperature.

In view of the above-described problems associated with providing a heating system for each optical amplifier provided in an optical network, and the problems associated with designing a practical gain flattening filter that also compensates for thermal wiggle, there exists a need for an optical amplifier system that does not require the use of a heater or thermal control system, has a gain spectrum that does not vary significantly as a function of operating temperature, and is practical to design and construct.

SUMMARY OF THE INVENTION

An aspect of the present invention is to provide an optical device comprising an optical amplifier to amplify optical signals received through an optical input and to supply the amplified optical signals from an optical output. The optical device further comprises an optical filter component to compensate for variations in the gain spectrum of the optical amplifier that occur as a function of wavelength and operating temperature. The optical filter component includes a first optical filter having an athermalized transmission spectrum, and a second optical filter having a transmission spectrum that varies as a function of operating temperature.

Another aspect of the present invention is to provide an optical filter for flattening the gain of an optical amplifier that has a gain spectrum that varies as a function of operating temperature. The optical filter comprises a first optical filter portion having an athermalized transmission spectrum, and a second optical filter portion having a transmission spectrum that varies as a function of operating temperature. The first and second optical filter portions combine to compensate for variations in the gain spectrum of the optical amplifier that occur as a function of wavelength and operating temperature.

It is another aspect of the present invention to provide a method of compensating for variations in the gain spectrum of an optical amplifier that occur with variations in operating temperature. The method comprising the steps of (a) providing a first optical filter having an athermalized insertion loss spectrum, and (b) providing a second optical filter having an insertion loss spectrum that varies with fluctuations in operating temperature, and that, when combined with the insertion loss spectrum of the first optical filter, compensates for variations in the optical amplifier gain as a function of wavelength.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

BRIEF DESCRIPTION OF THE DRAWINGS

In the drawings:

FIG. 4 is a graph showing the variation in the gain spectrum caused by a shift in the operating temperature; and FIG. 5 is a graph illustrating the variation in the transmission spectra of a gain-flattening optical filter constructed in accordance with the present invention caused by a corresponding shift in operating temperature similar to that affecting the gain spectrum shown in FIG. 4.

DETAILED DESCRIPTION OF THE PREFERRED EMBODIMENT

Figure 1:
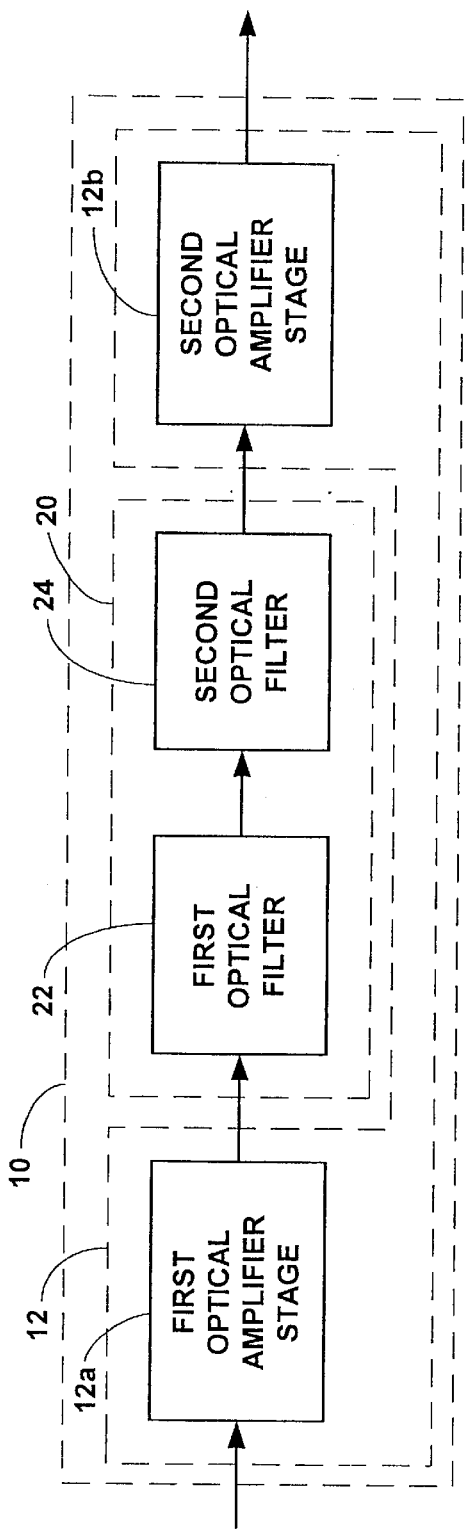
FIG. 1 is a block diagram of an optical amplifier system constructed in accordance with the present invention.

Reference will now be made in detail to the present preferred embodiment of the invention, an example of which is illustrated in the accompanying drawings. Wherever possible, the same reference numerals will be used throughout the drawings to refer to the same or like parts.

FIG. 1 shows an optical device in the form of an optical amplifier system 10 constructed in accordance with the present invention. As shown, optical amplifier system 10 includes an optical amplifier 12 and a gain-flattening filter 20. As will be described further below, gain-flattening filter 20 preferably includes a first optical filter 22 and a second optical filter 24, and optical amplifier 12 includes a first stage 12a and a second stage 12b each including an amplifying medium, such as a coil. First and second optical filters 22 and 24 are coupled between the input and the output of the optical device and are preferably coupled in series between stages 12a and 12b.

Figure 2:
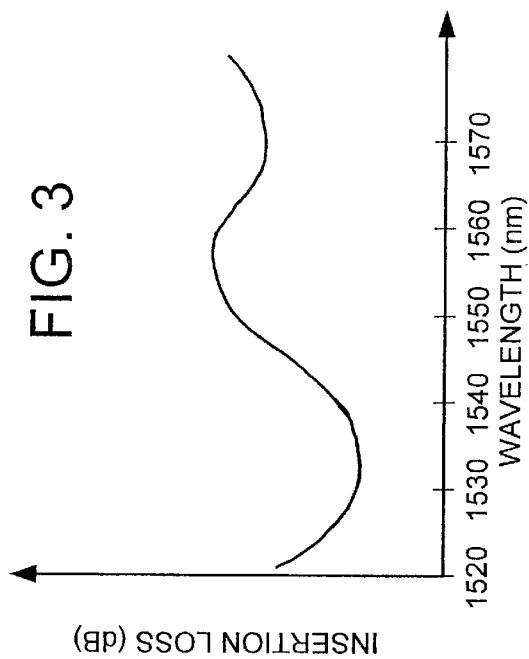
FIG. 2 is a graph showing the gain of a typical optical amplifier as a function of wavelength.

FIG. 2 is a plot of the gain of optical amplifier 12 as a function of wavelength. As illustrated, the gain of optical amplifier 12 is not flat, but rather is a function of wavelength.

Figure 3:
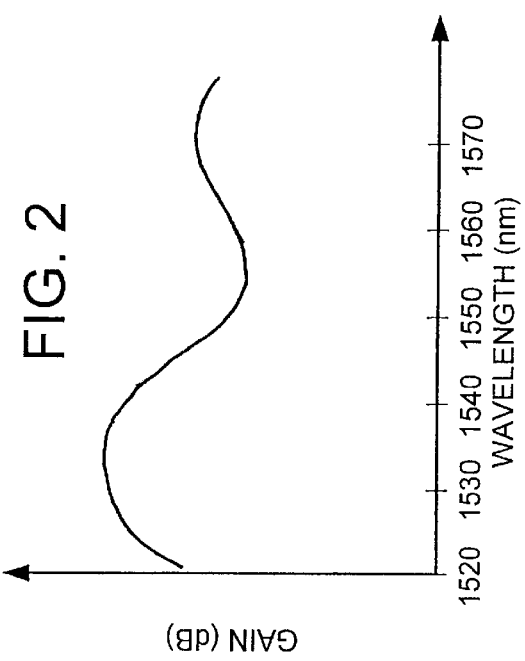
FIG. 3 is a graph showing the transmission characteristics as a function of wavelength for a gain-flattening optical filter constructed in accordance with the present invention.

FIG. 3 is a plot of the insertion loss with respect to wavelength $\lambda$ for an ideal gain-flattening filter 20 when used with an optical amplifier 12 having the gain spectrum illustrated in FIG. 2. As will be apparent to those skilled in the art, if a gain-flattening filter 20 were combined with such an optical amplifier 12, the output of the optical amplifier system 10 would exhibit uniform gain across the wavelength band of interest.

FIG. 4 shows two plots of the gain spectrum (i.e., gain as a function of wavelength) of optical amplifier 12 each taken at different operating temperatures $T_1$ and $T_2$. As apparent from FIG. 4, the gain spectrum of optical amplifier 12 changes shape with changing temperature.

Rather than utilizing a heating or thermal control system as described above, the optical amplifier system 10 of the present invention employs a gain-flattening filter 20 that is designed to experience a shape change in its insertion loss spectrum (i.e., insertion loss as a function of wavelength) as the operating temperature changes that corresponds to a shape change in the amplifier gain spectrum. An example of an ideal gain-flattening filter for use with an optical amplifier having the gain spectrum shown in FIG. 4 is illustrated in FIG. 5. Thus, the gain-flattening filter 20 of the present invention has a loss spectrum that is a function of not only wavelength, but temperature, so as to track the changes in the gain spectrum resulting from a change in operating temperature. This solution is described mathematically as follows.

First, the rate of thermal gain change of the amplifier is measured by measuring the gain G of optical amplifier 12 at a first temperature $T_1$ and then again measuring the gain of optical amplifier 12 at a second temperature $T_2$. The rate of thermal gain change is thus approximated as:

$$\frac{\Delta G}{\Delta T} = \frac{G(T_2) - G(T_1)}{T_2 - T_1}$$

This approach to the design of the gain-flattening filter 20 assumes a linear change of amplifier gain with temperature. In reality, the gain change is not strictly linear, nor is the gain shape change the same from one wavelength to the next. Moreover, the gain shape change at one wavelength is not related by a simple scaling of the gain shape change in another wavelength. Despite these caveats, however, the assumption of linearity is sufficiently good to permit substantial cancellation of thermal gain variation over a wide range of temperatures.

For an ideal optical amplifier system 10, the net gain of the system $G_{net}$ ($G_{net}$ is erbium gain minus the gain flattening filter insertion loss spectrum) should not vary substantially with changes in temperature T. Thus, gain-flattening filter 20 should be designed such that $$\frac{dG_{net}}{dT} = 0.$$

To obtain this result, the first order derivative $$\left(\frac{dL}{dT}\right)$$

of the filter insertion loss (L) with respect to operating temperature must be substantially equal to the linearized first order derivative $$\left(\frac{dG}{dT}\right)$$

of the gain of the optical amplifier with respect to operating temperature.

As noted above, we can determine the value of $$\frac{dG}{dT}$$

simply by measuring the gain spectrum of the optical amplifier at different temperatures over an operating temperature range.

As shown in FIG. 1, gain-flattening filter 20 may include a first optical filter 22 and a second optical filter 24. Two such filters are preferably utilized to make the overall gain-flattening filter more practical to design. More specifically, first optical filter 22 may be designed to have an athermalized insertion loss spectrum (i.e., an insertion loss spectrum that is substantially stable over the operating temperature range) while second optical filter 24 may be designed to have an insertion loss spectrum that varies substantially as a function of operating temperature. In this manner, the sum of optical filters 22 and 24 may be designed for optimal gain flattening as a result of wavelength without concern for the extent of thermal ripple of optical amplifier 12. Second optical filter 24 is designed with the aim to closely match the thermal gain variation of optical amplifier 12 without as much concern for compensating for the change in gain as a function of wavelength. Thus, the insertion loss spectra of first and second optical filters 22 and 24 are additive and thereby combine to compensate for variations in the gain of optical amplifier not only as a function of wavelength but also as a function of operating temperature.

The aggregate gain-flattening filter insertion loss spectrum (L) is equal to the sum of the insertion loss $L_1$ of first optical filter 22 and the insertion loss $L_2$ of second optical filter 24 (i.e., $L=L_1+L_2$). The net gain of $G_{net}$ of optical amplifier system 10 is thus equal to the gain G of optical amplifier 12 minus the insertion loss $L_1$ of first optical filter 22 minus the insertion loss $L_2$ of second optical filter 24 (i.e., $G_{net}=G-L_1-L_2$). Because $L_1$ does not vary with temperature $$\left(\frac{dL_1}{dT} = 0\right),$$

the following equation should hold true:

$$\frac{dG_{net}}{dT} = \frac{dG}{dT} - \frac{dL_2}{dT} = 0$$

The second filter insertion loss spectrum $L_2$ is a function of wavelength $\lambda$ and thermal dependence function $\lambda_0(T)$. The second filter spectrum $L_2$ ($\lambda-\lambda_0(T)$) and thermal filter spectral shape change is designed such that:

$$\frac{d\lambda_0}{dT} \cdot \frac{dL_2}{d\lambda} = -\frac{dG}{dT}$$

Here, the thermal dependence of the second filter spectrum is assumed to be entirely contained within the term $\lambda_0(T)$. This implies that the entire filter spectrum shifts bodily with respect to wavelength when the temperature changes. For most cases, $\lambda_0$ changes approximately linearly with temperature and, for some structures, increases with increasing temperature, and for other structures decreases with increasing temperature.

To design a gain-flattening filter having the desired characteristics, first optical filter 22 may be designed using conventional techniques to ensure that it does not have an insertion loss spectrum that varies with respect to temperature while compensating for a significant portion of the gain of optical amplifier as a function of wavelength. For example, first optical filter 22 may be a conventional athermalized dielectric multi-layer thin film stack or an athermalized fiber Bragg grating (FBG). A FBG may be athermalized by mounting the end supports for the FBG to a substrate having a negative coefficient of expansion that counters that of the FBG. A dielectric multi-layer thin film stack typically includes alternating layers of a first material having a high index of refraction and a second material having a low index of refraction.

Second optical filter 24 is preferably a FBG. Such FBGs include an optical fiber having a plurality of substantially equally spaced changes in refractive index. A substrate having a pair of supports is used to hold the fiber on opposite sides of the grating. In general, as the fiber is exposed to increasing operating temperature, the fiber undergoes thermal expansion to expand linearly, which correspondingly increases the periodic spacings between the refractive index changes of the grating. The increase in these spacings changes the insertion loss spectrum of the FBG. By controlling the thermal expansion of the FBG, changes in the insertion loss spectrum as a function of operating temperature may be controlled. The thermal expansion of the FBG can be controlled through the selection of the materials of which the fiber and the support substrate are made.

The present invention as described further provides a method of compensating for variations in the gain spectrum of an optical amplifier that occur with fluctuations in operating temperature. The method includes the steps of providing an optical filter having an insertion loss spectrum that varies with fluctuations in operating temperature, and positioning the optical filter in the optical path of the optical amplifier.

While the above invention has been described with respect to an optical amplifier including an erbium doped fiber, the invention is equally applicable to a discrete Ramaan amplifier, as well as other forms of amplifiers having a gain spectrum that changes shape with changing operating temperature.

It will become apparent to those skilled in the art that various modifications to the preferred embodiment of the invention as described herein can be made without departing from the spirit or scope of the invention as defined by the appended claims.

The invention claimed is:

1. An optical device having an optical input and output, said optical device comprising:
   an optical amplifier to amplify optical signals received through the optical input of the device; and
   an optical filter component to compensate for variations in the gain spectrum of said optical amplifier that occur as a function of wavelength and operating temperature, wherein said optical filter component includes a first optical filter having an athermalized transmission spectrum, and a second optical filter having a transmission spectrum that varies as a function of operating temperature.

2. The optical device of claim 1, wherein said optical amplifier includes an erbium-doped fiber.

3. The optical device of claim 1, wherein said optical amplifier is a discrete Raman amplifier.

4. The optical device of claim 1, wherein said optical amplifier includes a doped waveguide.

5. The optical device of claim 1, wherein said first optical filter comprises a multi-layer stack of alternating layers of a first material having a high index of refraction and a second material having a low index of refraction.

6. The optical device of claim 1, wherein said first optical filter comprises a fiber Bragg grating.

7. The optical device of claim 1, wherein said second optical filter comprises a fiber Bragg grating.

8. The optical device of claim 1, wherein said second optical filter has an insertion loss whose first order derivative with respect to operating temperature is substantially equal to the linearized first order derivative of the gain of the optical amplifier with respect to the operating temperature, wherein the first order derivatives are not equal to zero.

9. The optical device of claim 4, wherein said second optical filter comprises a fiber Bragg grating.

10. An optical filter for flattening the gain of an optical amplifier that has a gain spectrum that varies as a function of operating temperature, said optical filter comprising:
    a first optical filter portion having an athermalized transmission spectrum; and
    a second optical filter portion having a transmission spectrum that varies as a function of operating temperature,
    wherein said first and second optical filter portions compensate for variations in the gain spectrum of said optical amplifier that occur as a function of wavelength and operating temperature.

11. The optical filter of claim 10, wherein said first optical filter portion comprises a multi-layer stack of alternating layers of a first material having a high index of refraction and a second material having a low index of refraction.

12. The optical filter of claim 10, wherein said second optical filter portion comprises a fiber Bragg grating.

13. The optical filter of claim 11, wherein said second optical filter portion comprises a fiber Bragg grating.

14. A method of compensating for variations in the gain spectrum of an optical amplifier that occur with fluctuations in operating temperature, the method comprising the steps of:
    providing a first optical filter having an athermalized insertion loss spectrum; and
    providing a second optical filter having an insertion loss spectrum that varies with fluctuations in operating temperature, and that, when combined with the insertion loss spectrum of the first optical filter, compensates for variations in the optical amplifier gain as a function of wavelength.

* * * * *